UNITED STATES PATENT OFFICE.

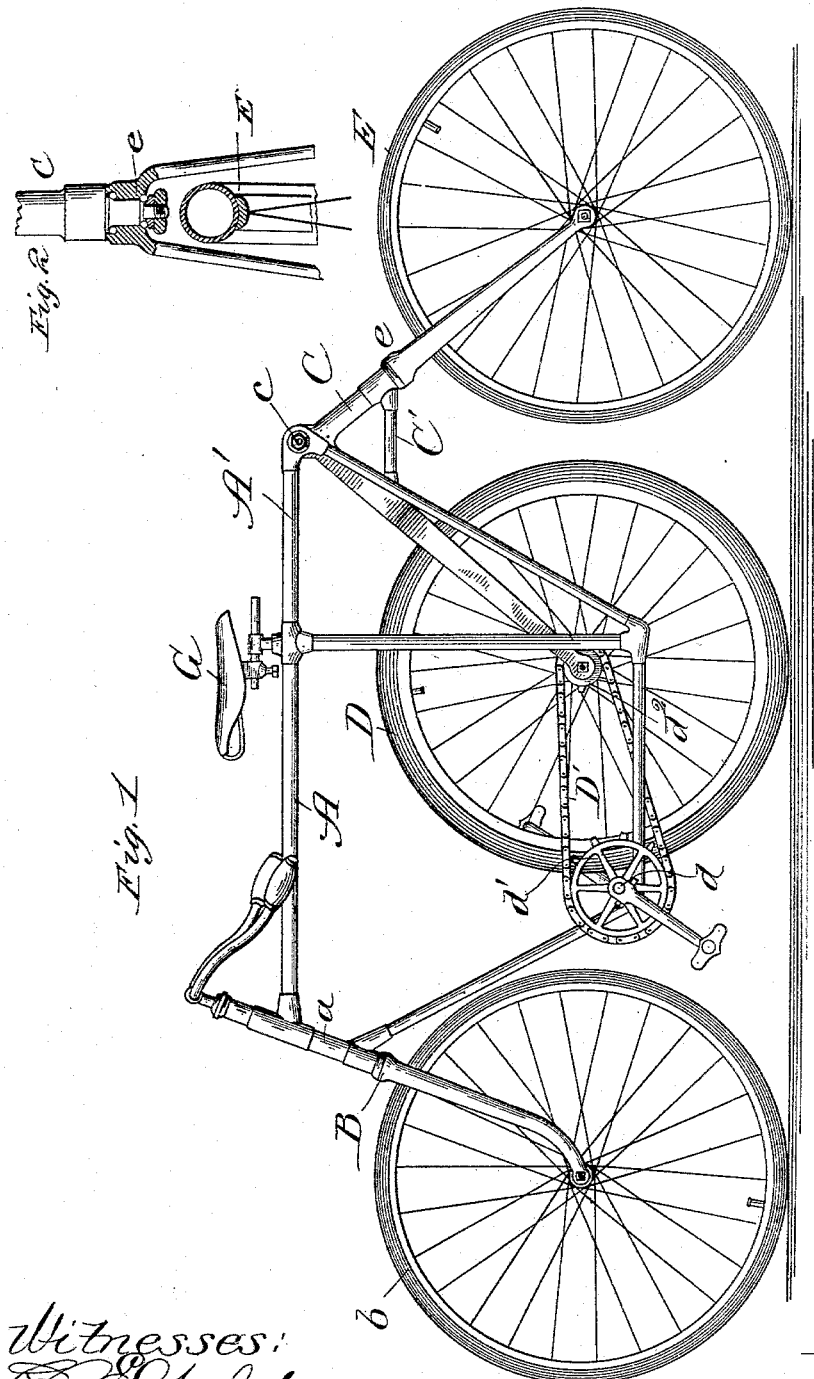

BOHN C. HICKS, OF CHICAGO, ILLINOIS.

VELOCIPEDE.

SPECIFICATION forming part of Letters Patent No. 548,366, dated October 22, 1895.

Application filed July 1, 1895. Serial No. 554,640. (No model.)

*To all whom it may concern:*

Be it known that I, BOHN C. HICKS, a citizen of the United States, residing at Chicago, Cook county, Illinois, have invented certain new and useful Improvements in Velocipedes, of which the following is a specification.

The object of my invention is to provide a simple, economical, and efficient velocipede particularly adapted to receive, absorb, and minimize the shocks caused by the wheels of the velocipede striking obstructions, &c.; and the invention consists in the features and combinations hereinafter described and claimed.

In the accompanying drawings, Figure 1 represents a side elevation of a velocipede or bicycle with my improvements attached thereto; and Fig. 2, an enlarged transverse sectional elevation of a portion of the vehicle-frame, taken on line 2 of Fig. 1, where the parts are pivoted together.

It is well known in the use of bicycles and velocipedes that when the wheel strikes an obstruction it must pass over the same and the rider, as well as the wheel, receives his due proportion of the shock which is caused thereby. Various structures have been designed to overcome and obviate these shocks, and particularly has the pneumatic tire been adapted for this purpose. It is well known, also, in order to obtain the greatest efficiency of the pneumatic tire that the air must be compressed therein to a high tension, ranging anywhere from twenty-five to fifty pounds' pressure per square inch. In such instances the tire is adapted to strike small obstructions, such as are incident to the ordinary gravel or macadamized roads, but not to receive the heavier bumps or shocks caused by striking the hard material on clay or dirt roads. On this latter class of roads as the front wheel is lifted over the obstruction the rider receives but a small proportion of the shock; but when the rear wheel, over which the rider is generally positioned, strikes the obstruction a large proportion of the shock is felt by the rider, sometimes sufficient to throw his feet from the pedals. A number of these shocks are apt to cause more or less injury to the rider and more or less destruction to different parts of the wheel. To overcome these objections and to provide a velocipede which will minimize the dangers caused by the shocks, and thereby save the rider and wheel from injury, is the principal object of my invention.

In illustrating my improvement I have shown it as attached to one form of wheel—namely, what is known as the "Safety" or "Rear Driver;" but it will be understood that it may be applied to any or all classes of these vehicles with slight mechanical changes, such as may be employed by the ordinary skilled mechanic.

In constructing my improvement I provide a frame A of the desired size and shape, secured to which is the usual front fork B, which is mounted in the bearings of the usual head portion $a$ and provided with the usual front wheel $b$. I prefer to extend the main frame to the rear, as A', and provide it with an auxiliary A-shaped frame C, which is pivoted at $c$ to the main frame. To the front of the depending arms of the auxiliary frame, and preferably at its lower end, is secured an ordinary driving-wheel D, which may be operated in the usual manner by means of the pedal-shaft $d$, sprocket $d'$, and chain D', which is passed over its sprocket $d^2$. To the rear depending arm or portion of the A-shaped frame, and preferably at the lower portion of such frame, is secured a supplemental or auxilliary wheel E. In order to make this supplemental wheel "track," the depending arm is pivoted at $e$ to the A-shaped frame by providing it with a common or ordinary ball-bearing, as illustrated in Fig. 2. A cross-brace C' secures or fastens both arms of the auxiliary frame together.

In using my improvement the saddle G may be placed at any desired position, but preferably over the driving-wheel, so that while riding as the front wheel strikes an obstruction it is raised over the same, and when the driving-wheel strikes the same or another obstruction it is lifted over it. As the frame is pivoted to the rear of the seat, it allows the frame to vibrate on its pivot and pass over such obstruction without imparting any sensible shock to the rider. When the supplemental wheel passes over the obstruction, the pivoting of the same enables it to pass over the obstruction, also, without any sensible shock being imparted to the rider or causing any injury to the wheel.

While I have described my improvement with more or less minuteness as to detail and as being embodied in certain precise forms, I do not desire to be limited thereto unduly, no more than is pointed out in the claims. On the contrary, I contemplate all proper changes in form, construction, and arrangement as circumstances may suggest or necessity render expedient.

I claim—

1. In a velocipede the combination of a main frame provided with a seat or saddle and front wheel by which the structure is guided and steered, with an auxiliary frame pivoted to the main frame to the rear of the seat portion and provided with at least two wheels arranged substantially in line with each other, one a driving wheel and the other a supplemental or auxiliary wheel, substantially as described.

2. In a velocipede, the combination of a main frame provided with a front steering wheel, handle bars, saddle, pedals, crank and sprocket wheel, with an auxiliary A-shaped frame pivoted to the main frame at the rear of the saddle or seat portion and provided with at least two wheels, arranged substantially in line with each other at least one on each of its members, one a driving wheel connected by means of a sprocket and chain with a pedal crank, and the other an auxiliary or supplement wheel, substantially as described.

3. In a velocipede, the combination of a main frame provided with a front steering wheel, handle bars, saddle, pedals, crank shaft and sprocket-wheel, with an auxiliary A-shaped frame pivoted to the main frame at the rear of the saddle or seat portion and having its front member provided with a driving wheel and sprocket arranged to be driven by means of a sprocket chain from the crank shaft, and its rear member pivoted to the A-shaped frame and provided with an auxiliary or supplemental wheel arranged substantially in line with the driving wheel, substantially as described.

BOHN C. HICKS.

Witnesses:
ANNIE C. COURTENAY,
THOMAS B. MCGREGOR.